Nov. 30, 1965   P. METZ   3,221,327
AUTOMATIC TRACKING SYSTEMS
Filed April 17, 1963   3 Sheets-Sheet 3

United States Patent Office 3,221,327
Patented Nov. 30, 1965

3,221,327
AUTOMATIC TRACKING SYSTEMS
Pierre Metz, Paris, France, assignor to CSF-Compagnie générale de télégraphie Sans Fil, a corporation of France
Filed Apr. 17, 1963, Ser. No. 273,678
Claims priority, application France, Apr. 19, 1962, 895,030
4 Claims. (Cl. 343—7)

The present invention relates to automatic tracking systems.

More particularly, it is an object of the invention to provide a system which enables a missile in motion to discriminate between ground echoes and echoes from a target which moves with respect to ground. According to the invention, this is achieved by transmitting continuous electromagnetic waves and by taking into account the resulting Doppler effect.

It is well known that one of the main problems of the technique of automatic tracking of targets consists in locating these targets. This problem is complicated by the fact that, when the target is at a low altitude, the antennas of the missile, although directive, pick up echoes both from ground and from the target.

The system according to the invention is more particularly adapted for locating the targets which are moving towards the missile. This system comprises means for determining the highest Doppler frequency of the ground echoes, means for scanning the Doppler frequencies higher than these latter frequencies and further means for causing the receiver carried by the missile, once a Doppler signal having such a frequency has been received, to follow up this signal, whatever the variations of the frequency thereof.

The invention will be best understood from the following description and appended drawings, wherein.

Figure 1:
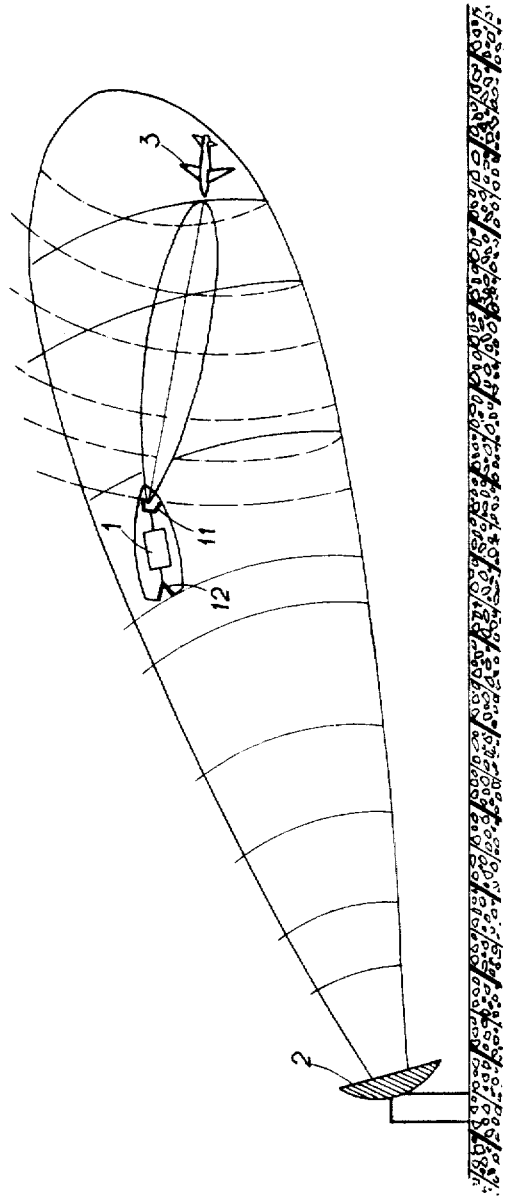
FIGURE 1 is an explanatory diagram illustrating the general operation of the invention.

FIGURE 1 shows a missile 1 equipped, with two antennas, i.e. a front antenna 11 and a rear antenna 12. This missile is assumed to receive from ground, through a radio-beacon 2, a continuous carrier wave of a very high frequency $f_o$, for example of the order of 10,000 mc./s.

Missile 1 is tracking a target 3, such as an airplane This target is covered by the beam of the radio-beacon 2 in the same time as missile 1. The latter is equipped with a receiver having two aerials 11 and 12, which respectively receive the energy radiated at the frequency $f_o$ by radio-beacon 2 and that reflected by airplane 3. Both aerials pick up the echoes from the ground.

Figure 2:
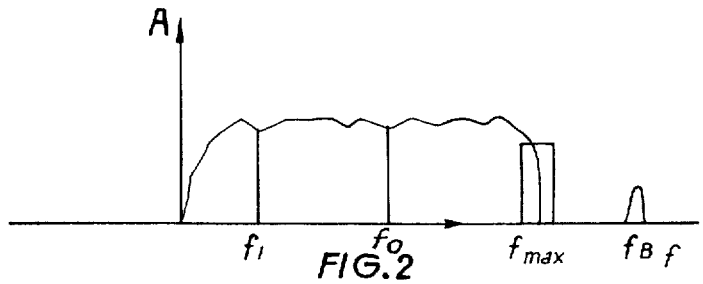
FIGURE 2 is an explanatory graph.

FIGURE 2 represents the frequencies of the returned signals, as modified by the Doppler effect. In this figure, the amplitudes A of the components of this spectrum are plotted versus their respective frequencies. The echoes from the ground have a frequency centered on the frequency $f_o$ of the continuous wave radiated by beacon 2.

The echoes from ground areas, which missile 1 leaves behind it while moving towards the target have a Doppler effect affected frequency lower than frequency $f_o$. The echoes from the ground areas just under the missile have a frequency $f_o$, and those from the ground areas in front of it have a frequecny higher than $f_o$. Plotting along the abscissae the respective frequencies of the incoming signals and along the ordinates, the corresponding signal amplitude, a continuous curve as shown in FIG. 2 will be obtained. As to the target 3 moving towards the missile, which is the only case of interest, it gives rise to a frequency affected by the Doppler effect $f_B$, higher than the highest frequency affected by the Doppler effect of an echo from the ground and clearly separated therefrom by a gap in the graph of FIG. 2.

This invention operates on these physical data. The receiver carried by missile 1 is arranged for sweeping the frequency band comprising the frequencies affected by the Doppler effect of the ground echoes. Starting from the highest of these frequencies, the receiver makes another frequency excursion to find the frequency affected by the Doppler effect of an echo from the moving targets 3. The receiver is then locked to this frequency and follows it up.

Otherwise stated, the location of a target is effected in two stages: (a) the highest frequency affected by the Doppler effect of the echoes from the ground is determined; (b) starting from this frequency, the target Doppler effect affected frequency of the echo is determined and the receiver is locked to this frequency.

Figure 3:
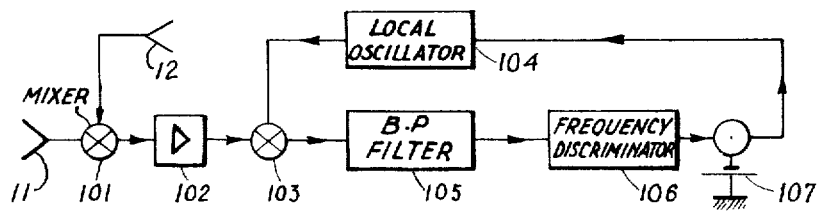
FIGURE 3 is a block diagram of a portion of the circuit according to the invention.
Figure 4:
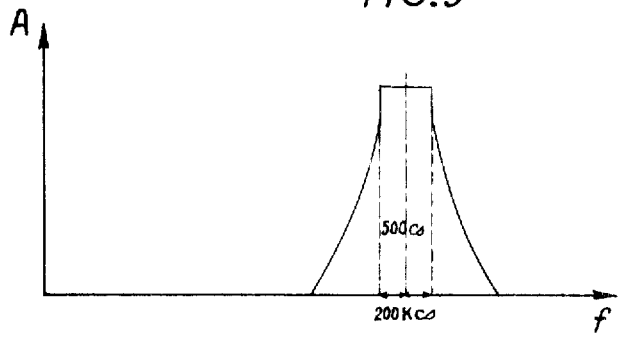
FIGURES 4 and 5 are explanatory graphs.
Figure 5:
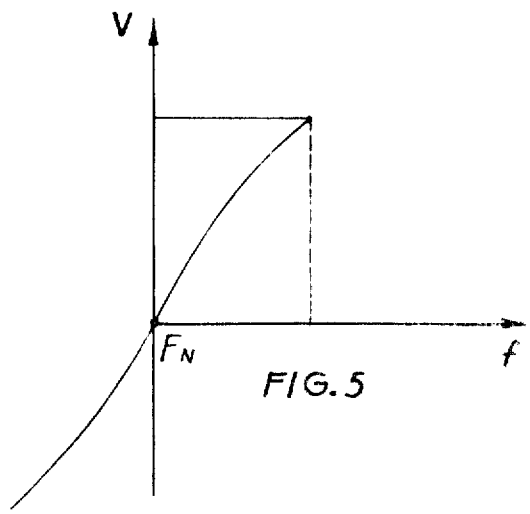

FIG. 3 is a block diagram of the receiver portion for sweeping the Doppler effect affected frequencies of the ground echoes. It comprises aerial 11, which picks up the ground echoes only from the ground areas forwardly of missile 1. The echoes are mixed in a mixer 101 with the continuous wave picked up by antenna 12. The output of mixer 101 is filtered and amplified in an amplifier 102 to provide the Doppler echoes and fed to a mixer 103 which also receives the output of a local oscillator 104. The output signals of this mixer are filtered in a narrow-band filter 105 (the response curve amplitude A versus frequency $f$ of which is shown in FIGURE 4) and then applied to a frequency discriminator and, if necessary to integrator arrangement 106. The latter is centered about a frequency $F_o$ and delivers a positive or negative voltage which is a function of the frequency of the input signal. This voltage is shown as a function of this frequency in FIG. 5. It will be assumed, by way of example, that output voltage V varies between 0 and 10 v., and is zero for a predetermined frequency $F_N$. This voltage is integrated before being applied to oscillator 104.

Another D.C. voltage source, which delivers a voltage —5 v., makes it possible to obtain, by addition, a voltage ranging from —5 v. to +5 v., which voltage is applied to oscillator 104 to adjust the frequency thereof. Oscillator 104 is, for example, an electrically tunable tube or an oscillator the tuning circuit of which comprises a variable reactance tube.

The control voltage is assumed to increase the operating frequency of the tube when positive and to decrease the same, when negative.

The operation of the circuit of FIG. 3 is as follows:

The output of amplifier 102 comprises the Doppler frequency signals corresponding to the graph of FIG. 2. Since antenna 11 picks up only the echoes from the ground areas forwardly of missile 1, it may be assumed that the Doppler frequencies concerned are comprised between 0 and 50 kc./s., 50 kc./s. being the maximum Doppler frequency of the ground echoes.

Filter 105 is assumed to have a pass-band, the central frequency of which is 200 kc./s., its bandwidth being equal to 500 c./s. Beacon 1 is assumed to operate at a frequency of 10,000 mc./s. ($\lambda=3$ cm.) and a Doppler frequency of 50 kc./s. corresponds to a speed of the order of 4 Mach.

If $F_o$ is the initial oscillation frequency of oscillator 104, the Doppler spectrum in FIG. 2 will contain a frequency $f_1$ such that $-f_1+F_o$ will be within the pass band of filter 105, i.e., 200 kc./s.±500 c.

Discriminator 106 will be assumed to deliver a zero voltage for $F_N$ slightly lower than 200 kc./s., for example for $F_N=199$ kc./s.

The output of filter 105, which is applied to the input of the discriminator and integrator arrangement 106, will cause the latter to provide a positive voltage, comprised between 0 and 10 v., since the frequency 200 kc./s. of the filter output is higher than $F_N$. This results in an increase of the frequency F of the local oscillator.

The frequency of the local oscillator will increase until the Doppler frequency which is subtracted therefrom is the maximum Doppuer frequency $f_{max}$, whereafter no further Doppler frequency is passed.

At this instant, no further signal will be passed by filter 105. The negative voltage from source 107 will cause the frequency of oscillator 104 to drop, until frequency $f_{max}$ is again passed.

Thus, a system is provided for controlling the frequency of the local oscillator 104 and permanently tuning it in such a manner that it should beat with the maximum Doppler frequency of the ground echoes.

It may be noted that this is achieved by providing a feedback loop between one of the inputs and the output of mixer 110.

Figure 6:
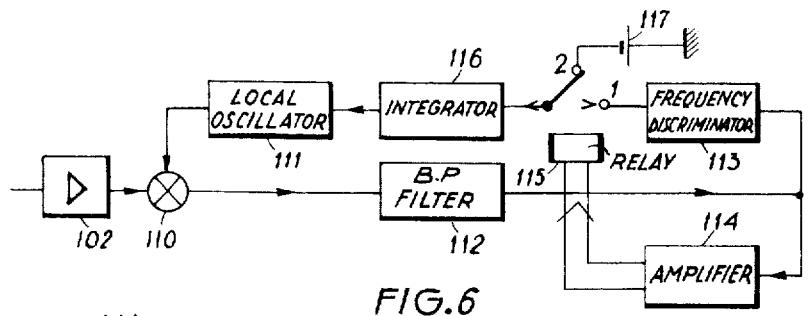
FIGURE 6 is a block diagram of another portion of the circuit according to the invention.

In the circuit of FIG. 6, a further portion of the system according to the invention is shown. This circuit locks a second local oscillator to the Doppler frequency of the echo from the movable target which moves towards the missile, which is the only echo of interest.

This highest ground echo returned signal frequency $f_B$ is substantially higher than those of the ground echoes. If the target has a velocity of say 1200 km./h., i.e. 300 m./s., the Doppler frequency is of the order of 7 kc./s., while those of the ground echoes do not exceed 5 kc./s. in the present case.

The circuit of FIG. 6 comprises a local oscillator 111 and causes it to sweep frequencies higher than the ground echo Doppler frequencies. This circuit comprises a second mixer 110, connected to the output of amplifier 102. Mixer 110 receives the output of the local oscillator 111, whose frequency it is desired to keep locked to the Doppler frequency of the moving target.

The output signal of mixer 110 is filtered in a filter 112, for example identical to filter 105 of FIG. 3. It may have the same central frequency 200 kc./s. and the same bandwidth 500 c./s. As in the case of FIG. 3, filter 105 is a part of a feedback loop extending from mixer 110 to oscillator 110.

The output signal of filter 112 is transmitted to a discriminator 113, which contrary to discriminator 106 provides no output when the input frequency is the central frequency of filter 112, and to an amplifier 114 which controls a relay 115, having positions 1 and 2. In position 1, relay 115 connects discriminator 114 to an integrator circuit 116. Relay 115 is in position 1 when amplifier 114 receives a signal from filter 112. In the opposite case, relay 115 is in position 2 and connects integrator 116 to a D.C. source 117 providing a constant voltage of, for example, 1 volt.

Figure 7:
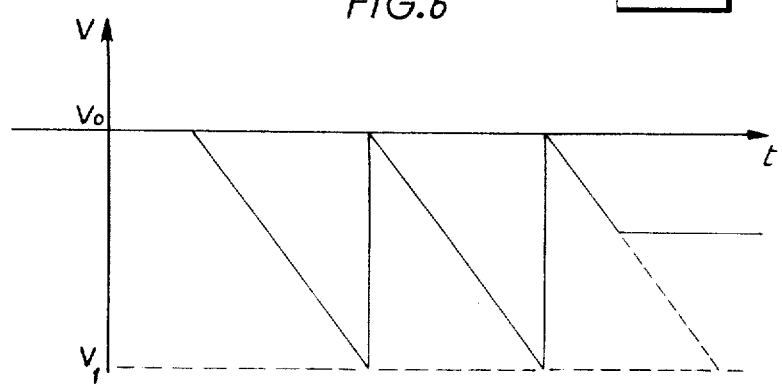
FIGURE 7 is an explanatory graph.

Integrator 116, when connected to source 117, delivers a saw-tooth voltage as illustrated in FIGURE 7. This voltage decreases, for example from $V_o=0$, to $V_1=-5$ v., etc. It will be seen that the minimum value of this voltage determines the minimum frequency of oscillator 111, this frequency being equal to the frequency of oscillator 104.

The operation of the system shown in FIG. 6 is as follows:

Oscillator 111 has at the initial instant a frequency F. Under the action of integrator 116, which, in the absence of any echo, is connected to source 117, this frequency decreases, the integrator voltage varying from zero to a negative voltage.

If at an instant $t$ an echo is received and a signal appears at the output of mixer 110, this signal, which corresponds to an echo from a target moving towards missile 1, i.e., is such that $f_B>f_{max}$, will have two effects:

(a) it will, through amplifier 114, trip relay 115 from position 2 to position 1;

(b) since discriminator 113 will receive an input signal at 500 kc./s., it will deliver an output voltage. Integrator 116 will then deliver a constant voltage which will maintain the frequency of oscillator 116 at a constant value, corresponding to the echo received.

The local oscillator 111 will thus have its frequency locked to Doppler frequency of the echo, in the sense that, if the Doppler frequency of the echo varies by a given amount, it will vary by the same amount. If the Doppler frequency of the echo varies, the output voltage of the discriminator will be positive or negative, as the case may be. This output will modify the frequency of the local oscillator accordingly.

Figure 8:
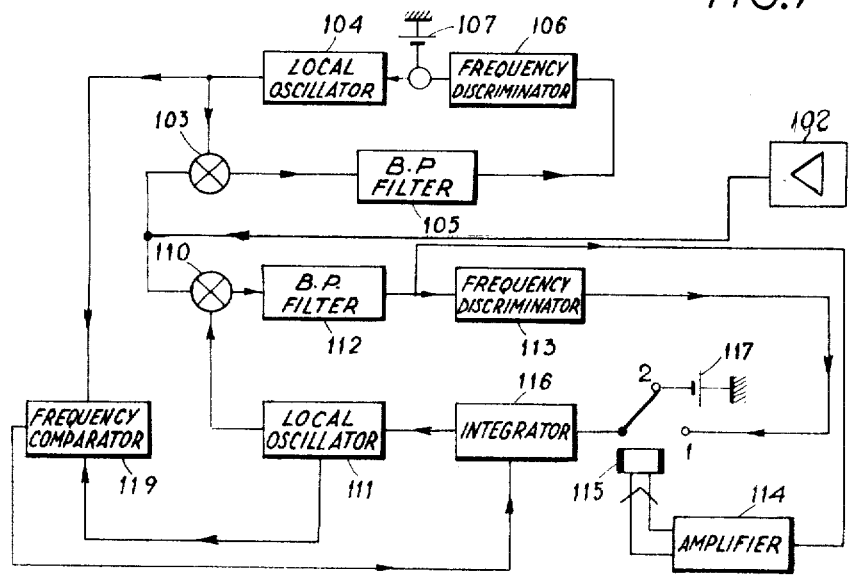
FIGURE 8 is a block diagram of a system according to the invention.

FIGURE 8 shows how the systems of FIGS. 3 and 6 are in fact interconnected for causing the frequency of oscillator 111 to effect its frequency excursions starting only from the frequency to which oscillator 104 is locked, i.e. above that corresponding to the highest ground echo Doppler frequency. In FIG. 8 the same reference numerals designate the same elements as in FIGS. 3 and 6.

The outputs of oscillators 104 and 111 are connected to a frequency comparator 119. As indicated above, the frequency of oscillator 111 decreases, under the action of integrator 116, whereas that of oscillator 104 increases. When these two frequencies are equal the comparator 119 transmits a signal, which discharges the capacity of integrator 116 and causes a sudden increase of its output voltage, bringing thus again the frequency of oscillator 111 to its highest value. In other terms, the moment when the two oscillators 104 and 111 have the same frequency marks the begining of each operating cycle.

Of course the invention is not limited to the embodiments described and shown which were given solely by way of example.

What is claimed, is:

1. A system for automatic tracking missiles, intended for discriminating moving target echoes from ground echoes, comprising: antenna means for receiving signals transmitted from ground, for receiving said signals as echo signals reflected from ground and for receiving said signals as echo signals reflected from said target; first mixing means coupled to said antenna means for mixing said signals and deriving therefrom Doppler frequency signals; second mixing means, having a first input, coupled to said first mixing means and a second input; a first local oscillator for providing a first local oscillation, having a frequency control input, and an output coupled to said second input for providing a first difference signal; filtering means for filtering said difference signal within predetermined frequency limits; a discriminator, responsive to said filtered difference signal and coupled to said control input for increasing the frequency of said local oscillator, thus increasing the frequency of said first difference signal; means coupled to said control input for lowering the frequency of said local oscillator, once the discriminator is no longer active, thus locking said first local oscillator frequency to the highest Doppler frequency corresponding to a ground echo; a second local oscillator, having a frequency control input, for providing a second local oscillation; third mixing means for mixing said Doppler frequency signal with said second local oscillation for providing a second difference signal; further means for bringing the frequency of said second oscillator to a lower limit, equal to said locked frequency, and means for raising it again to an upper limit; second filtering means coupled to said third mixing means for filtering said second difference signal within predetermined limits; a second discriminator coupled to said second filtering means; and means responsive to said filtering second difference signal, for selectively coupling said second local oscillator control input to said discriminator or to said further means.

2. A system for automatic tracking missiles for discriminating moving target echoes from ground echoes comprising: antenna means for receiving signals transmitted from ground, for receiving said signals as echo signals reflected from ground and for receiving said signals as echo signals reflected from said target; first mixing means coupled to said receiving means for mixing said signals and deriving therefrom Doppler frequency signals; second mixing means, having a first input coupled to said first mixing means and a second input; a first local oscillator, having a frequency control input and an output coupled to said second input; a feedback loop between said second mixing means and said control input, said loop including means for locking the frequency of said oscillator to the highest Doppler frequency of said ground echoes; third mixing means having a third input, coupled to said first mixing means, and a fourth input; a second local oscillator having a second frequency control input and an output coupled to said fourth input; means for causing said oscillator frequency to sweep cyclically a frequency band having a lower limit equal to said locked frequency and a predetermined upper limit; and a feedback loop between said third mixing means and said second control input for locking the frequency of said second oscillator to a Doppler frequency higher than said highest Doppler frequency of said ground echoes.

3. A system for automatic tracking missiles for discriminating moving target echoes from ground echoes comprising: antenna means for receiving signals transmitted from ground, for receiving said signals as echo signals reflected from ground and for receiving said signals as echo signals reflected from said target; first mixing means coupled to said receiving means for mixing said signals and deriving therefrom Doppler frequency signals; second mixing means, having a first input coupled to said first mixing means and a second input; a first local oscillator, having a frequency control input and an output coupled to said second input; a band pass filter having a center frequency; a frequency discriminator having a zero voltage frequency different from said center frequency, connected between said filter and said frequency control input; means for causing said local oscillator frequency to decrease when said discriminator is inactive; a second local oscillator having a control frequency input and a variable frequency output; a third mixer connected to said first mixer and to said second oscillator output; a second band pass filter having a center frequency, connected to said third mixer; a frequency discriminator connected between said filter and said input of said second oscillator, said disciminator having a zero voltage frequency equal to said center frequency of said second filter; means for decreasing the frequency of said second oscillator; an integrator connected to said second oscillator control input; a switch actuated by said filter for selectively connecting to said integrator said decreasing means and said discriminator; comparator means for comparing the respective frequencies of said first and second local oscillators; and means for abruptly raising the frequency of said second local oscillator to its upper limit when its frequency is equal to said first local oscillator.

4. A system for automatic tracking missiles for discriminating moving target echoes from ground echoes comprising: antenna means for receiving signals transmitted from ground, for receiving said signals as echo signals reflected from ground and for receiving said signals as echo signals reflected from said target; first mixing means coupled to said receiving means for mixing said signals and deriving therefrom Doppler frequency signals; second mixing means, having a first input coupled to said first mixing means and a second input; a first local oscillator, having a frequency control input and an output coupled to said second input for deriving from said second mixing means a difference signal; feedback means for locking the frequency of said local oscillator to a predetermined one of said Doppler frequencies; a second local oscillator; further mixing means for mixing the output signal of said second oscillator and said Doppler frequency signals; means for causing said second local oscillator to vary cyclically its frequency between an upper limit and a lower limit equal to said locked frequency; and a feedback loop for locking the frequency of said second local oscillator to a frequency higher than the frequency to which said first local oscillator is locked.

References Cited by the Examiner

UNITED STATES PATENTS 2,871,468   1/1959   Smith _____ 343—7.7

CHESTER L. JUSTUS, *Primary Examiner.*